Dec. 2, 1930.  E. A. GUSTAFSON  1,783,917
SPEEDOMETER DRIVE CLAMP
Filed March 19, 1927
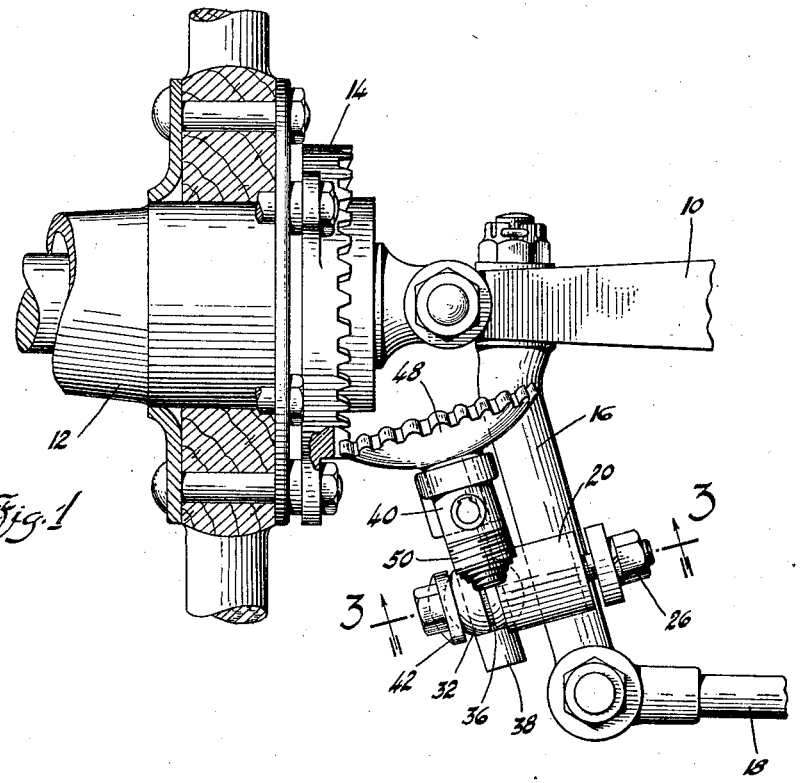
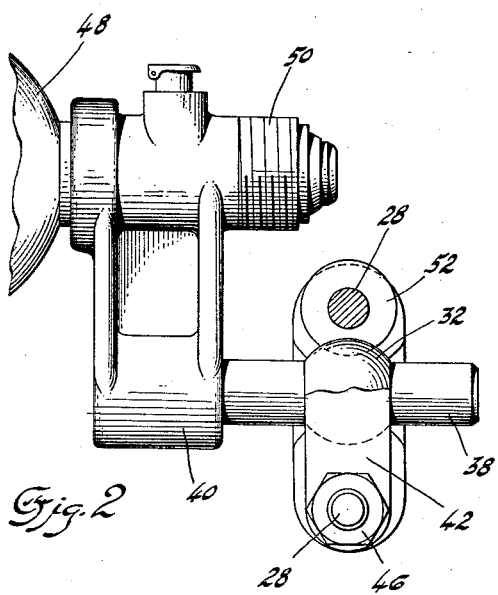
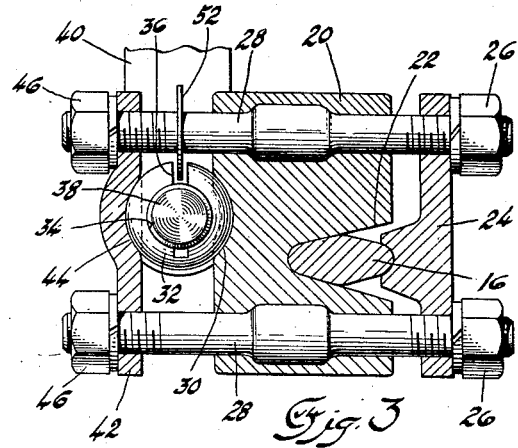
Inventor
Edwin A. Gustafson
By Blackmore, Spencer & Hulit
Attorneys Patented Dec. 2, 1930

1,783,917

UNITED STATES PATENT OFFICE

EDWIN A. GUSTAFSON, OF FLINT, MICHIGAN, ASSIGNOR TO A C SPARK PLUG COMPANY, OF FLINT, MICHIGAN, A COMPANY OF MICHIGAN

SPEEDOMETER-DRIVE CLAMP

Application filed March 19, 1927. Serial No. 176,756.

This invention relates to a speedometer drive clamp of the type which is adapted to support a driven pinion upon a portion of the front axle of an automobile, so that it will mesh with a driving gear secured to one of the front wheels.

It has for an object the providing of a clamp of this character having a wide range of adjustability in all directions to compensate for varying shapes and locations of the part on which it is to be mounted.

Other and further objects and advantages of the invention are set forth in the accompanying specifications and drawings, in which—

Figure 1 is a plan view of a portion of the front axle of an automobile showing my improved clamp applied thereto.

Figure 2 is a fragmentary side elevation of the speedometer drive bearing member and its associated clamping means.

Figure 3 is a section taken on line 3—3 of Figure 1.

Pivotally mounted on the front axle 10 is a front wheel 12 on which is supported in a well known manner, the speedometer driving gear 14. Connected to the steering wheel is a steering arm 16, actuated by the steering cross rod 18 which is also attached to the opposite front wheel and is operated by the steering mechanism.

As has been previously done, I mount the bearing, in which the driven pinion rotates, upon the steering arm 16. Owing to the fact that this type of speedometer drive is usually placed on the automobile after it has left the factory, it is desirable to be able to furnish one type of clamp, which will fit the steering arms of all yearly models of a particular make of car. It will be found that the steering arm of one model will be either of a different shape or located differently than the steering arm of another model of the same kind of car. Each time the car manufacturer makes a new set of dies for forging the steering arm, it is apt to be changed slightly in shape, as for his requirements a little variation will make no difference, but as it is very essential that the speedometer driving gears be properly meshed, I propose to so construct the clamping means as to permit the correct adjustment of the gears regardless of the shape or location of the steering arm, or other part upon which it is to be mounted.

I accomplish this by providing for universal adjustment of the speedometer driven pinion bearing, in addition to the usual axial adjustment. The clamp body 20 has a notch 22 adapted to receive the steering arm 16 which in the drawing is shown as being of oval cross section. Clamped against the arm 16 is a plate 24, held by nuts 26 which are threaded on bolts 28, cast in the clamp body 20.

At the opposite side of the clamp body 20 is provided a spherical depression 30 adapted to receive a ball 32 having a central opening 34 and being split at one side as at 36 to permit of its being clamped tightly about the pin 38 which is fixed in the bearing member 40. The ball 32 is held in place in the depression 30 by a clamping member 42 having a spherical depression 44, to receive the ball. The clamping member is drawn against the ball by nuts 46 threaded on bolts 28. Journalled in the bearing member 40 is the driven pinion 48 which drives the usual flexible shaft leading to the speedometer head. This flexible shaft is encased in a flexible tube which is fastened to the member 40 by means of a nut, not shown, which engages threads 50.

The ball 32 being split at 36 so that the pin 38 may be easily inserted and later clamped tightly, it is desirable to keep the split 36 in a vertical position as shown. It is obvious that should the split 36 be permitted to work around to an approximate horizontal position, the clamping action will be lost. To keep it in the vertical position, a washer 52 is slipped over the upper bolt 28 and is of such a diameter that it fits in the slot 36 and thus keeps the ball 32 from rotating to any great extent while adjusting the location of the pinion.

It will thus be seen that before tightening the nuts 46, the pin 38 carrying the bearing member 40 may be easily slid back and forth in the opening 34 in the ball 32, and at the same time the ball 32 may be swiveled in the depressions 30 and 44 to permit the proper meshing of the pinion 48 with the gear 14. This exact adjustment is necessary to prevent the rapid wearing of the teeth and to give quiet operation.

By using this universally adjustable clamp, it is no longer necessary for the accessory dealer to carry a different type clamp for each yearly model of a particular make of car.

Obviously in lieu of the gear 14 herein shown such a driving gear as is shown in United States Letters Patent 1,541,468, June 9, 1925, issued on a joint application of Joseph Berge and myself, may be used.

It is thought from the foregoing taken in connection with the accompanying drawings, that the construction and operation of the device will be apparent to those skilled in the art, and that various changes in size, shape, and proportion and details of construction may be made without departing from the spirit and scope of the appended claims.

I claim:

1. A speedometer drive comprising, in combination, a driven pinion, a bearing for the pinion, mounting means for said bearing affording axial and universal adjustment of said bearing, said bearing having a portion rotatably held in said mounting means on an axis different from the axis of said pinion, and a single clamping means for holding said bearing in adjusted position.

2. A speedometer drive comprising, in combination, a driven pinion, a bearing for the pinion, a hollow ball member in which said bearing is rotatably mounted to permit axial adjustment of said bearing, the axis of said ball member being different from the axis of said pinion and clamping means for holding said ball member in a selected position.

3. A speedometer drive comprising, in combination, a driven pinion, a bearing for the pinion, a split ball member in which said bearing is mounted to permit axial adjustment of said bearing, clamping means for holding said ball member in adjusted position, and means associated with said clamping means to engage said split ball for the purpose of limiting the rotation of the latter.

4. A speedometer drive comprising, in combination, a driven pinion, a bearing for the pinion, a split ball member in which said bearing is mounted to permit axial adjustment of the latter, clamping means for holding said ball in any desired position, and a washer associated with said clamping means to engage said split ball for the purpose of limiting the rotation of the latter.

5. A speedometer drive comprising, in combination, a driven pinion, a bearing for the pinion, mounting means for said bearing, a clamping body, through bolts held in said body, a steering arm, a clamping plate, means associated with said bolts to draw the clamping plate against said steering arm, a clamping member, and means on the opposite ends of said bolts to clamp said mounting means between said clamping member and said clamping body.

6. A speedometer drive clamp comprising, in combination, a front axle, a steering wheel mounted on the axle, a steering arm secured to the wheel for turning the latter, a driving gear on the steering wheel, a driven pinion, a support for the pinion, a ball in which said support is rotatably mounted to permit axial and universal adjustment of the latter, the axis of said ball being different from the axis of said pinion, a clamping body secured to said steering arm, and a single clamping means to hold said support in position to effect proper engagement of the gear and pinion.

In testimony whereof I affix my signature.

EDWIN A. GUSTAFSON.